(12) United States Patent
Führer et al.

(10) Patent No.: US 10,704,666 B2
(45) Date of Patent: Jul. 7, 2020

(54) TRANSMISSION

(71) Applicant: ZF Friedrichshafen AG, Friedrichshafen (DE)

(72) Inventors: Kim Führer, Lindau (DE); Martin Brehmer, Tettnang (DE); Andreas Geiger, Markdorf (DE); Thomas Riedisser, Lindau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 637 days.

(21) Appl. No.: 15/386,769

(22) Filed: Dec. 21, 2016

(65) Prior Publication Data
US 2017/0184191 A1 Jun. 29, 2017

(30) Foreign Application Priority Data
Dec. 23, 2015 (DE) .................. 10 2015 226 679

(51) Int. Cl.
| F16H 57/021 | (2012.01) |
| F16C 17/10 | (2006.01) |
| F16C 19/06 | (2006.01) |
| F16C 17/02 | (2006.01) |
| F16C 19/18 | (2006.01) |
| F16C 35/063 | (2006.01) |
| B60K 6/36 | (2007.10) |
| B60K 6/405 | (2007.10) |

(52) U.S. Cl.
CPC ........... *F16H 57/021* (2013.01); *F16C 17/02* (2013.01); *F16C 19/06* (2013.01); *F16C 19/184* (2013.01); *F16C 35/063* (2013.01); *B60K 6/36* (2013.01); *B60K 6/405* (2013.01); *B60Y 2200/92* (2013.01); *F16C 17/10* (2013.01); *F16C 2361/61* (2013.01); *Y10S 903/902* (2013.01)

(58) Field of Classification Search
CPC .............................. F16H 57/021; F16C 17/10
USPC ............................................................ 74/661
See application file for complete search history.

(56) References Cited

U.S. PATENT DOCUMENTS

| 5,099,717 A * | 3/1992 | Ochiai ................ H02K 5/15 |
| | | 74/425 |
| 9,528,436 B2 | 12/2016 | Kasuya et al. |
| 9,586,468 B2 * | 3/2017 | Kubo ................. B60K 6/40 |
| 2013/0213043 A1 * | 8/2013 | Kasuya ................ F02B 63/04 |
| | | 60/700 |

(Continued)

FOREIGN PATENT DOCUMENTS

| DE | 112013000259 T5 | 9/2014 |
| DE | 102014202621 A1 | 8/2015 |

(Continued)

OTHER PUBLICATIONS

German Search Report DE102015226679.6, dated Dec. 29, 2016. (8 pages).

Primary Examiner — Ha Dinh Ho
(74) Attorney, Agent, or Firm — Dority & Manning, P.A.

(57) ABSTRACT

A transmission for a motor vehicle includes an electric motor. A rotor shaft is connected in a torque-proof manner to a rotor of the electric motor. At least one bearing directly supports the rotor shaft. A transmission shaft is connected in a torque-proof manner to the rotor shaft. Both the transmission shaft and the rotor shaft are supported directly on a transmission component by the at least one bearing.

15 Claims, 4 Drawing Sheets

(56) References Cited

U.S. PATENT DOCUMENTS

2013/0291374 A1* 11/2013 Ohnemus ................ B60K 6/48
29/598

FOREIGN PATENT DOCUMENTS

| DE | 102014208799 A1 | 11/2015 |
| DE | 112015000947 T5 | 11/2016 |
| WO | WO 2015/152126 A1 | 10/2015 |
| WO | WO 2015/169523 A1 | 11/2015 |

* cited by examiner

TRANSMISSION

FIELD OF THE INVENTION

The invention relates generally to a transmission for a motor vehicle, with a rotor shaft that is connected in a torque-proof manner to the rotor of an electric motor, at least one bearing that directly supports the rotor shaft, a transmission shaft that is connected in a torque-proof manner to the rotor shaft, a multi-speed transmission gearing in operative connection with the transmission shaft and an output shaft in operative connection with the transmission shaft by the transmission gearing.

The invention also relates generally to a hybrid drive and a motor vehicle with such a transmission.

BACKGROUND

A multitude of transmissions, which consist of a conventional multi-speed gear set and a hybrid unit, are known from the state of the art. Each of the two systems is self-supporting and has its own central axis of rotation. In the assembled state of the transmission, the two systems are connected to each other in a torque-proof manner. This necessarily results in a redundancy that, depending on the order of magnitude during operation, causes vibrations and noises or, in the worst case, even damages the bearing. The two central axes of rotation of the two systems can never be exactly superimposed on each other, due to the manufacturing tolerances of the participating components, such that the central axes of rotation are never perfectly aligned with each other. In most cases, they are crossed, parallel or crooked relative to each other. As a result of this defective arrangement of the central axes of rotation relative to each other, constraining forces arise in the transmission causing the aforementioned problems.

A transmission that features a hybrid module is known from DE 10 2014 202 621 A1. A rotor shaft, which is coupled to an electric motor of the hybrid module, is supported by a bearing on the transmission housing. In addition, the rotor shaft is connected in a torque-proof manner and is supported on a transmission shaft that is coupled to a multi-speed transmission gearing. The transmission shaft is supported on the transmission housing by two other bearings. The rotor shaft is supported on the transmission housing by the torque-proof connection between the rotor shaft and the transmission shaft, the transmission shaft and the other bearing. In this version as well, the problem exists that, due to manufacturing tolerances the central axes of rotation of the rotor shaft and the transmission shaft are not perfectly aligned with each other.

SUMMARY OF THE INVENTION

As such, exemplary aspects of the invention provide a transmission with which the central axes of rotation of the rotor shaft and the transmission shaft are arranged better relative to each other or are aligned with each other relative to known transmissions.

Exemplary aspects of the invention provide a transmission of the aforementioned type, which is characterized in that both the transmission shaft and the rotor shaft are supported directly on a transmission component by the at least one bearing.

The transmission in accordance with exemplary aspects of the invention has the advantage that the mounting of the the rotor shaft and the transmission shaft takes place in such a manner that a redundancy no longer exists, such that the central axes of rotation of the rotor shaft and the transmission shaft are better arranged relative to each other and, in the ideal case, are aligned with each other. This is realized by the fact that both the rotor shaft and the transmission shaft are supported on the transmission component by the same bearing. Thereby, the at least one bearing can absorb forces in the radial and/or axial direction, in particular in both axial directions.

The transmission component can be any component of the transmission, such as, for example, a transmission housing or the retainer explained below. In addition, one exemplary advantage of the invention is that the rotor shaft is no longer indirectly supported on the transmission housing by the transmission shaft, but is supported directly on the transmission component by the at least one bearing. This reduces the tolerance path between the bearing of the rotor shaft and the stator. The result is a transmission that has a better arrangement of the central axes of rotation of the rotor shaft and the transmission shaft relative to each other.

The direct mounting of the rotor shaft by the at least one bearing means that no other component is arranged between the rotor shaft and the at least one bearing. The support of the rotor shaft and the transmission shaft directly on the transmission component by the at least one bearing means that no other component is arranged between the at least one bearing and the transmission component. The transmission shaft can also be supported directly on the transmission component by the at least one bearing, that is, without the provision of additional components between the transmission shaft and the at least one bearing. Alternatively, the transmission shaft can be indirectly supported on the transmission component by the at least one bearing. In this case, one or more components can be arranged in the radial direction between the transmission shaft and the at least one bearing. For example, the rotor shaft can be arranged between the transmission shaft and the at least one bearing, such that the transmission shaft is supported on the transmission component by the rotor shaft and the at least one bearing.

Within the meaning of this invention, a shaft is not to be understood exclusively as, for example, a cylindrical, rotatably mounted machine element for transferring torque. Rather, it is understood to also include general connecting elements that connect individual components to each other, in particular connecting elements that connect multiple components in a torque-proof manner.

The electric motor includes at least of one stationary stator and the rotatably mounted rotor, and in engine mode is configured to convert electrical energy into mechanical energy in the form of rotational speed and torque, and in generator mode is configured to convert mechanical energy into electrical energy in the form of current and voltage. The electric motor can be arranged in a transmission housing.

With a particular version, the transmission features an input shaft that can be coupled to an internal combustion engine. The input shaft is connectable to the rotor shaft in a torque-proof manner by a shift element. The shift element can be a clutch, in particular a multi-disk clutch. Whether the torque provided by the internal combustion engine is transferred to the transmission shaft can be set by the shift element.

For the purposes of this invention, a torque-proof connection is understood as a connection between two components that is formed in such a manner that the two components connected to each other always feature the same rotational speed. This is possible if, for example, no shift element is arranged between the two components connected to each other, since, otherwise, the rotational speeds of the two components can differ from each other in the open state of the shift element. In addition, for the purposes of this invention, a connection between two components is designated as "connectable to the rotor shaft in a torque-proof manner" if a shift element is arranged between the two components connected to each other.

The multi-speed transmission gearing can feature multiple gear sets, such as, for example, planetary gear sets, by which different gears with different transmission ratios can be realized.

In addition, the transmission can feature a retainer for retaining the electric motor, in particular the stator. The retainer can be connected in a torque-proof manner to an intermediate housing, whereas the connection between the retainer and the intermediate housing can be formed to be detachable. The intermediate housing can be connected in a torque-proof manner to the transmission housing. Thus, the electric motor, in particular the stator, can advantageously be connected to the intermediate housing in a torque-proof manner solely by the retainer, thus, without the provision of additional connections. This simplifies the assembly of the electric motor in the transmission.

The assembly process is simplified particularly if the stator is connected to the retainer prior to installation in the transmission. In addition, the rotor shaft can be coupled to the electric motor prior to the installation of the rotor shaft in the transmission. As a result, at least the electric motor and the retainer form a hybrid module, which can be easily installed in the transmission or removed from the transmission.

The transmission shaft and the rotor shaft can be supported on the retainer by the at least one bearing. In this case, the retainer corresponds to the aforementioned transmission component. Since the retainer is connected in a torque-proof manner to the intermediate housing, and this is connected in a torque-proof manner to the transmission housing, the transmission shaft and the rotor shaft are supported on the transmission housing by the at least one bearing and the retainer through the intermediate housing. The retainer can have a different bearing that also supports the rotor shaft.

With a particularly preferred embodiment, the transmission shaft can be connected in a torque-proof manner to the rotor shaft by a positive-locking connection. The positive-locking connection preferably can be formed as a spline. A spline is a shaft-hub connection, wherein the torque is transferred by tooth flanks. The shaft is externally toothed, while the hub is internally toothed. Splines are characterized by a simple establishment of the connection. In addition, the shaft and hub can be displaced axially relative to each other, in particular in the unencumbered state.

The at least one bearing can be arranged in the radial direction, in particular in the radial direction starting from the transmission shaft, between a section of the retainer and a section of the rotor shaft. In particular, the at least one bearing can be attached to the section of the rotor shaft that is connected in a torque-proof manner to the transmission shaft. Thus, the section of the rotor shaft can feature the hub of the aforementioned spline. Thus, there is a plane at which the transmission shaft, the section of the rotor shaft connected to the transmission shaft, the at least one bearing, and the retainer are arranged.

In addition to the at least one bearing, the transmission shaft can be supported by an additional bearing. In particular, the transmission shaft can be supported directly on the transmission housing or through the output shaft by the additional bearing. Thereby, the additional bearing can be arranged on the output shaft, such that the transmission shaft and the output shaft are supported, in particular directly, on the transmission housing by the bearing.

With a particular version, the at least one bearing can be formed as a rolling bearing that is configured to absorb forces in the axial direction. In particular, the at least one bearing can be formed in such a manner that it transfers forces to the transmission component in the axial and radial direction.

With one version, only a single bearing, which absorbs the axial and radial forces, can be provided. Thus, the rotor shaft and the transmission shaft can be supported in a radial and axial direction by a single bearing. Alternatively, the bearing can comprise first and second bearings, whereas the first and/or second bearings are able to absorb the axial and radial forces. In addition, the bearing can alternatively comprise first and second bearings, which can absorb only radial forces. In this case, the bearing can additionally comprise an axial bearing.

The bearing can be supported in the axial direction on one side on the rotor shaft, and on another side on a shoulder of the transmission shaft. Thereby, the one side can directly fit on the rotor shaft and the other side can directly fit on the shoulder of the transmission shaft. Thus, in a simple manner, it is ensured that the bearing absorbs the respective axial force of the transmission shaft independently of the direction of the axial movement of the transmission shaft. The one side of the bearing can face the other side with respect to a normal plane running perpendicular to the central axis of rotation of the rotor shaft.

It is particularly advantageous if the at least one bearing is a double-row angular ball bearing. In this case, only one bearing is required. The double-row angular ball bearing can be formed in an O-arrangement, and features the advantage that, upon an actuation of the shift element, it can very easily absorb the axial forces. In addition, the transmission shaft is mounted very easily in axial manner, and thus can perform only a small axial movement. This is absolutely necessary with shift elements that are actuated by a release bearing, such that a good shifting quality is guaranteed.

Alternatively, the bearing can comprise a single-row angular ball bearing and a second single-row angular ball bearing. The provision of two single-row angular ball bearings is advantageous to the extent that it is more cost-effective than a single double-row angular ball bearing. The first single-row angular ball bearing and the second single-row angular ball bearing can be spaced apart from each other in the axial direction and/or can be arranged in an O-arrangement. An adjusting element, such as, for example, an adjusting disk, can be arranged between the first single-row angular ball bearing and the second angular ball bearing. The adjusting element serves to enlarge the bearing base (that is, the distance between the first angular ball bearing and the second angular ball bearing in the axial direction), and to compensate for any backlash between the two angular ball bearings, the rotor shaft and the transmission shaft.

Moreover, a backlash between the rotor shaft, the at least one bearing and the transmission shaft can be compensated for by the provision of a clamping device, which causes the at least one bearing to be preloaded. The clamping device can feature a groove nut, which is screwed onto the transmission shaft. By the rotor shaft, the clamping device exerts an axial force on the at least one bearing, such that the at least one bearing is pressed against the shoulder of the transmission shaft. With the version with which two single-row angular ball bearings are provided, the axial force exerted by the clamping device is transferred through the rotor shaft, the first single-row angular ball bearing, the adjusting element to the second single-row angular ball bearing. The preloading of the at least one bearing also has the advantage that the rigidity of the bearing arrangement is improved, the running accuracy increases and damages to the bearing can be avoided.

With an alternative version, the bearing can comprise a first radial bearing, in particular a first slide bearing, and a second radial bearing, in particular a second slide bearing. The provision of slide bearings is particularly suitable for transmissions with which little installation space is available in the radial direction. In addition, slide bearings enable an excellent damping of the rotor shaft. The radial bearings serve exclusively to absorb a radial force. Therefore, the bearing can at least comprise an axial bearing, whereas the axial bearing can be an axial needle bearing.

With a particular version, the positive-locking connection can be arranged at least partially between the first and second radial bearings, in particular between the first and second slide bearings. The transmission shaft can be centered on the rotor shaft by a fitting. The force-fitting connection can be arranged, with respect to the input shaft and/or the internal combustion engine, further away in the axial direction than the positive-locking connection.

A hybrid drive, with which the internal combustion engine is coupled to the input shaft, is particularly advantageous. In addition, a motor vehicle that features the transmission in accordance with exemplary aspects of the invention or the hybrid drive is advantageous.

BRIEF DESCRIPTION OF THE DRAWINGS

The subject matter of the invention is shown schematically in the figures and is described below, whereas the same or equivalent elements are usually provided with the same reference signs. The following are shown.

DETAILED DESCRIPTION

Figure 1:
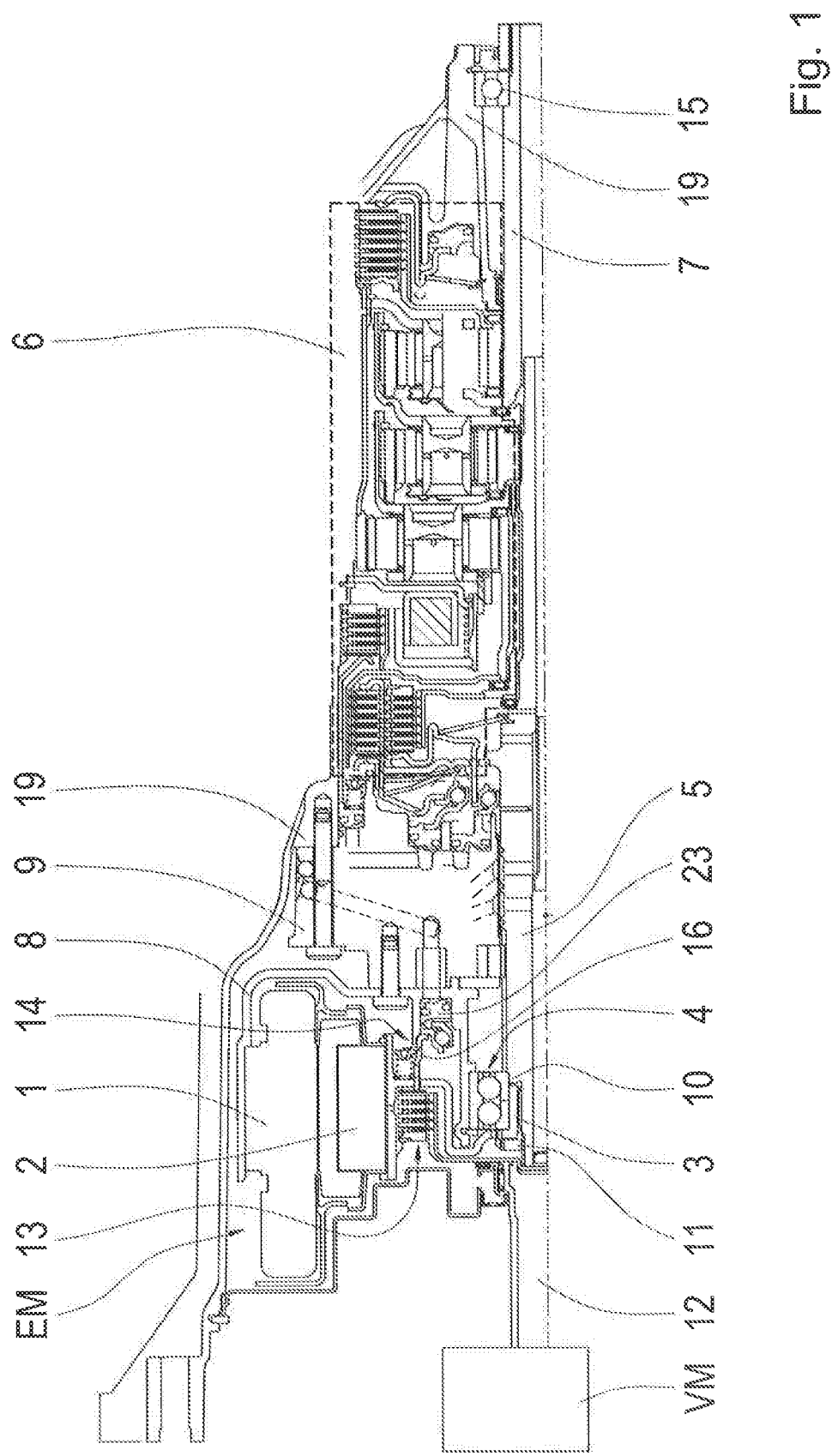
FIG. 1 a schematic view of a first embodiment of the transmission in accordance with exemplary aspects of the invention for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The transmission for a motor vehicle shown in FIG. 1 features an electric motor EM that is coupled in a torque-proof manner to a rotor shaft 3, and a bearing 4 that directly supports the rotor shaft 3. In addition, the transmission features a transmission shaft 5, which is connected in a torque-proof manner to the rotor shaft 3. The transmission shaft 5 is in operative connection with a multi-speed transmission gearing 6. In addition, the transmission features an output shaft 7, which is in operative connection with the transmission shaft 5 by the transmission gearing 6. Both the transmission shaft 5 and the rotor shaft 3 are supported on a transmission component described in more detail below by the bearing 4.

In the version shown in FIG. 1, the transmission component corresponds to a retainer 8, which serves to retain a stator 1 of the electric motor EM. The retainer 8 is detachably connected (in particular, screwed) to an intermediate housing 9. The intermediate housing 9 is connected in a torque-proof manner (in particular, screwed) to a transmission housing 19. The intermediate housing 9 features lines through which the individual components of the transmission can be supplied with fluid, in particular oil. In particular, the fluid can be fed to an actuating device 14, which is discussed further below. The electric motor EM features, in addition to the stator 1, a rotor 2 that is connected to the rotor shaft 3 in a torque-proof manner.

The bearing 4 is a double-row angular ball bearing in an O-arrangement, and is arranged in the radial direction between the rotor shaft 3 and the retainer 8. In this case, the bearing 4 is in direct contact with the rotor shaft 3 and the transmission shaft 5. In particular, an inner ring of the double-row angular ball bearing is attached to both the rotor shaft 3 and the transmission shaft 5. The inner ring is fixed in its axial position by the transmission shaft 5 and the rotor shaft 3, such that a relative movement between the inner ring and the rotor shaft 3 and/or the transmission shaft 5 is not possible. In particular, the inner ring abuts against a shoulder 10 of the transmission shaft 5 on one side. On an opposite side of the inner ring, the inner ring abuts against a section of the rotor shaft 3 projecting in the radial direction.

An outer ring of the double-row angular ball bearing is in direct contact with the retainer 8. The outer ring of the double-row angular ball bearing is fixed in its axial position by the retainer 8. This means that the outer ring cannot move in the axial direction relative to the retainer 8.

The rotor shaft 3 is connected in a torque-proof manner to the transmission shaft 5 by a spline. Thereby, the bearing 4 is arranged on a section of the rotor shaft 4, which features the internally toothed hub of the spline.

The transmission features a clamping device in the form of a groove nut 11. The groove nut 11 is screwed onto the drive shaft 5 and exerts an axial force on the rotor shaft 3 and thus the bearing 4. In particular, as a result of the force exerted by the groove nut 11, the bearing 4 is pressed against the shoulder 10 of the transmission shaft 5.

In addition, the transmission features an input shaft 12, which is coupled to an internal combustion engine VM, and a shift element 13 in the form of a clutch. The input shaft 12 is connectable in a torque-proof manner to the rotor shaft 3 by the shift element 13.

An actuation of the shift element 13 can take place by an actuating device 14, which can be, for example, a release bearing. In doing so, the actuating device 14 exerts an axial force for closing the shift element 13 on it. A lever 16 of the actuating device, through which the shift element 13 is actuated, extends through the rotor shaft 3. In addition, the actuating device 14 features a piston 23 that is coupled to the lever 16, which piston, upon the actuation of the actuating device 14, is subjected to a fluid and consequently moves in the axial direction. As a result of the axial movement of the piston, the lever 16 presses against the shift element 13 and thus exerts the axial force on the shift element 13.

The transmission gearing features a multiple number of planetary gear sets and shift elements, by which different gears can be realized with different transmission ratios.

The transmission shaft 5 is supported next to the bearing 4 by an additional bearing 15. The additional bearing 15 is arranged on the output shaft 7 and supports the output shaft 7 directly on the transmission housing 19.

Figure 2:
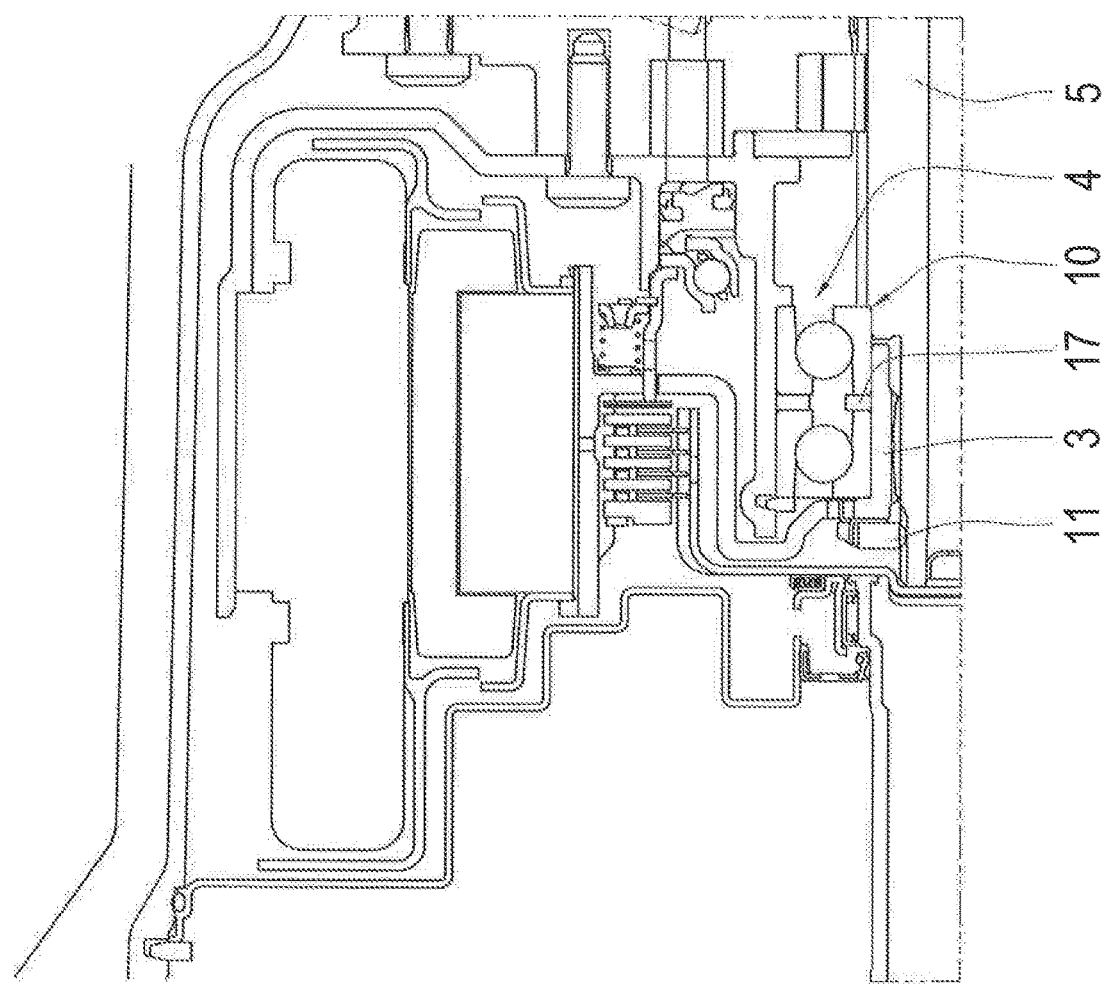
FIG. 2 an enlarged section of the transmission in accordance with exemplary aspects of the invention for a motor vehicle in accordance with a second embodiment.

FIG. 2 shows an enlarged section of the transmission in accordance with exemplary aspects of the invention for a motor vehicle in accordance with a second embodiment. The embodiment shown in FIG. 2 differs from the embodiment shown in FIG. 1 in the formation of the bearing 4.

Thus, the second embodiment shown in FIG. 2 features two single-row angular ball bearings in an O-arrangement. The two single-row angular ball bearings are arranged in a manner spaced apart in the axial direction. An adjusting disk 17 is arranged between the two angular ball bearings. The adjusting disk 17 is in direct contact with the inner rings of the two angular ball bearings.

The two angular ball bearings are preloaded by the groove nut 11. In particular, an axial force exerted by the groove nut 11 is transferred through the rotor shaft 3, a first angular ball bearing, the adjusting disk 17 to the second angular ball bearing, by which the second angular ball bearing is pressed against the shoulder 10 of the transmission shaft 3.

In addition, there is a difference with the embodiment shown in FIG. 1 in that only one inner ring of the angular ball bearing located further away from the input shaft and/or internal combustion engine is arranged both on the transmission shaft 5 and on the rotor shaft 3.

Figure 3:
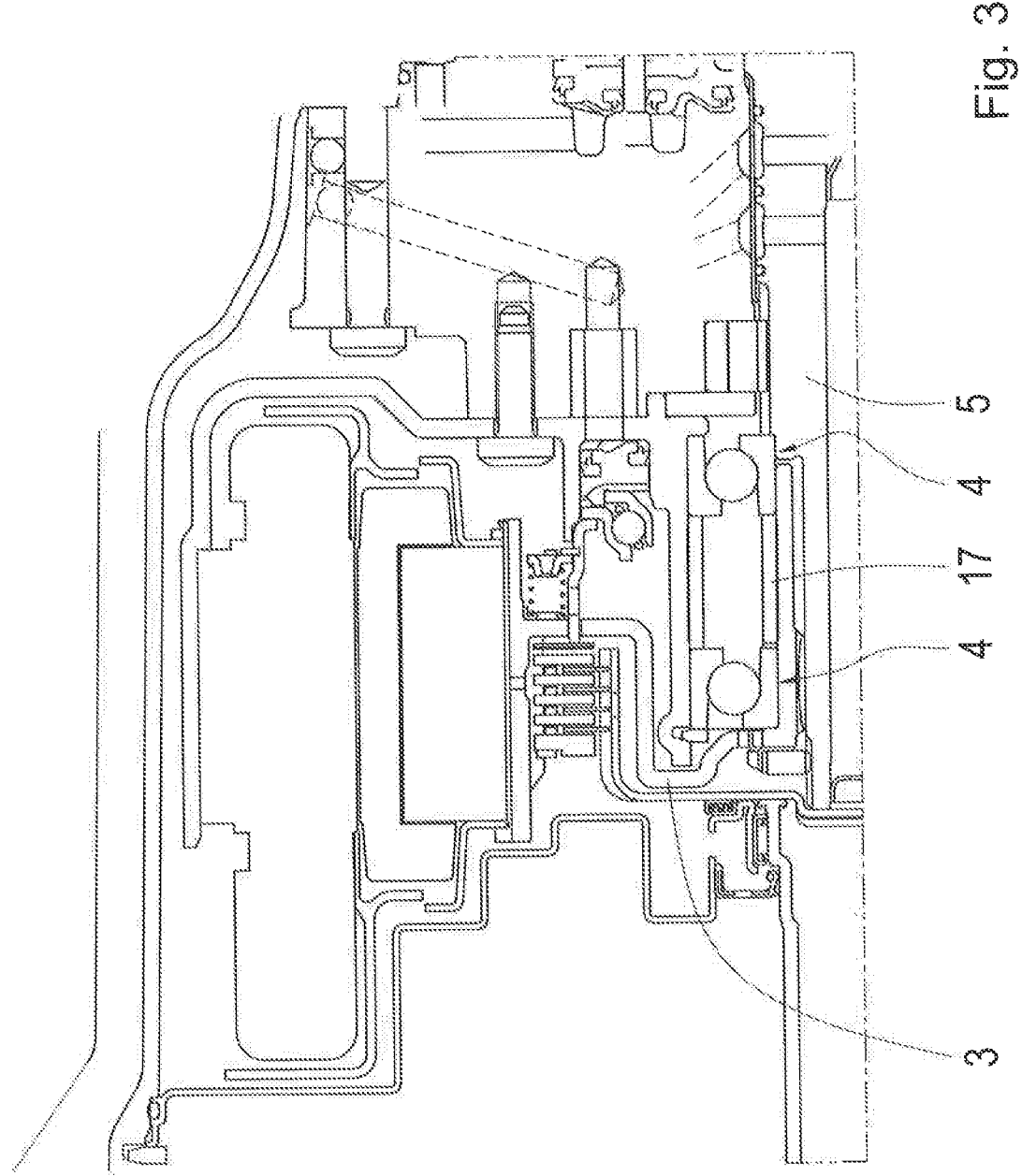
FIG. 3 an enlarged section of the transmission in accordance with exemplary aspects of the invention for a motor vehicle in accordance with a third embodiment.

FIG. 3 shows an enlarged section of the transmission in accordance with exemplary aspects of the invention for a motor vehicle in accordance with a third embodiment. The third embodiment differs from the second embodiment in the formation of a larger bearing base.

Figure 4:
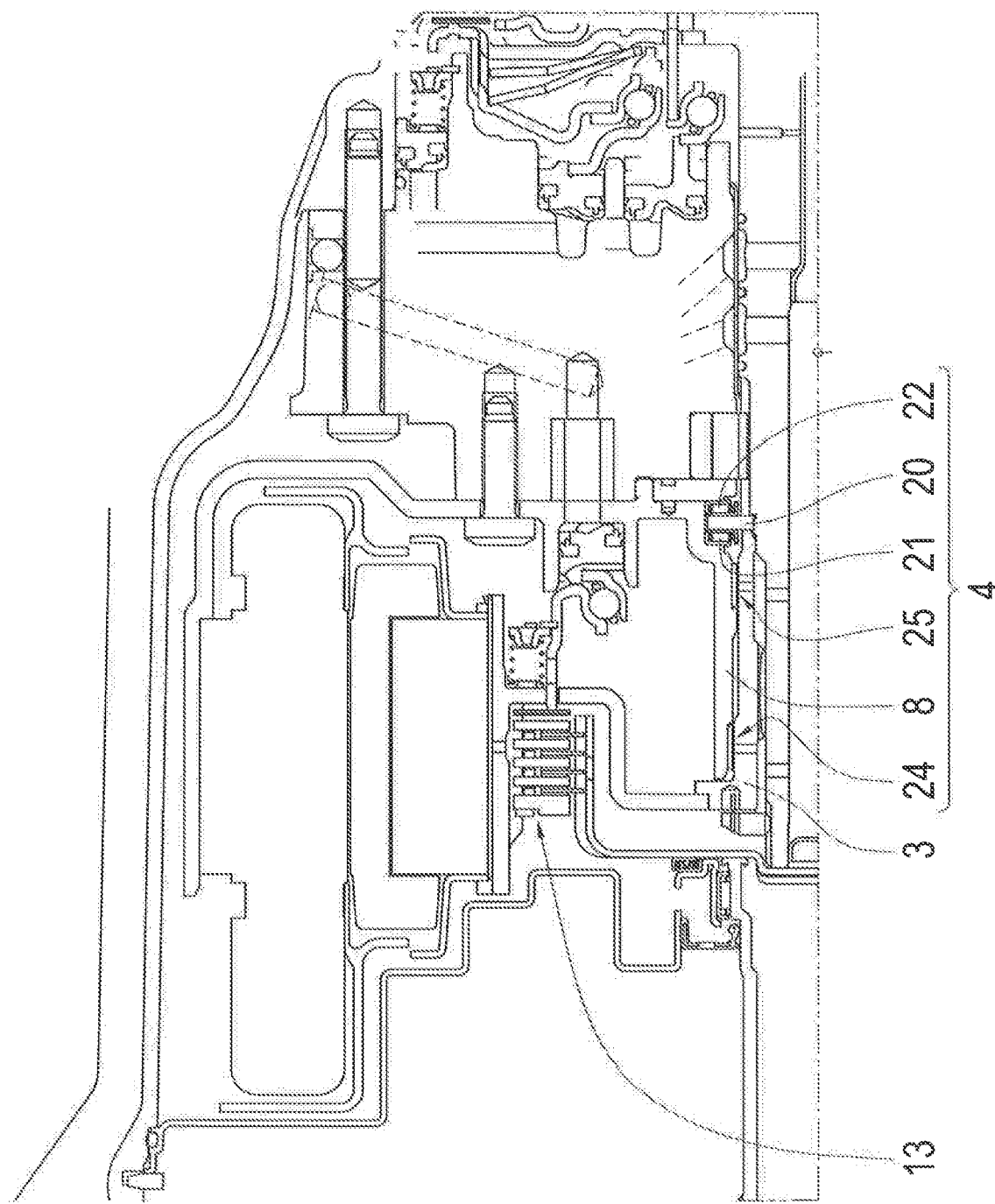
FIG. 4 an enlarged section of the transmission in accordance with exemplary aspects of the invention for a motor vehicle in accordance with a fourth embodiment.

FIG. 4 shows an enlarged section of the transmission in accordance with exemplary aspects of the invention for a motor vehicle in accordance with a fourth embodiment. With the embodiment shown in FIG. 4, a first slide bearing 24 and a second slide bearing 25 are present, by which the rotor shaft 3 and the transmission shaft 5 are supported on the retainer 8. The rotor shaft 3 is directly supported on the retainer 8 by the first and second slide bearings 24, 25. The two slide bearings 24, 25 are able to absorb radial forces exclusively. In addition, two axial bearings 21, 22, which absorb exclusively axial forces, are provided.

In addition to the plug connection, the rotor shaft 3 is centered on the transmission shaft 5 by a fitting. The fitting is arranged in an area of the transmission shaft 5, which is turned away from the internal combustion engine VM in the axial direction further than the plug connection. In particular, the fitting takes place in the area of the two axial bearings 21, 22.

The plug connection and the fitting support the transmission shaft 5 in the radial direction on the rotor shaft 3. This means that, in this version, the transmission shaft 5 is supported on the retainer 8 by the plug-in connection and the fitting, the rotor shaft 3 and the first and second slide bearings 24, 25.

The two axial bearings 21, 22 serve to absorb the axial forces acting on the transmission shaft 5, and are formed as axial needle bearings. Thereby, a first axial bearing 21 absorbs an axial force of the transmission shaft 5 in a first axial direction. This axial force can arise, for example, if the shift element 13 is actuated. A second bearing 22 absorbs an axial force in a second direction opposite to the first axial direction. This axial force can arise if, for example, one or more shift elements present in the transmission gearing 6 is closed.

Thereby, the axial force acting on the transmission shaft 5 is transferred to the first and/or second axial bearing 21, 22 through a transfer element 20. The transfer element 20 is arranged in the axial direction between the two axial bearings 21, 22 and is in operative connection with the transmission shaft 5. Thereby, the transfer element 20 is arranged free of backlash on the transmission shaft 5. In addition, the transfer element is in direct contact with the two axial bearings 21, 22 and the transmission shaft 5.

Modifications and variations can be made to the embodiments illustrated or described herein without departing from the scope and spirit of the invention as set forth in the appended claims.

REFERENCE SIGNS

1 Stator
2 Rotor
3 Rotor shaft
4 Bearing
5 Transmission shaft
6 Transmission gearing
7 Output shaft
8 Retainer
9 Intermediate housing
10 Shoulder
11 Groove nut
12 Input shaft
13 Shift element
14 Actuating device
15 Additional bearing
16 Lever
17 Adjusting disk
19 Transmission housing
20 Transfer element
21 First axial bearing
22 Second axial bearing
23 Piston
24 First slide bearing
25 Second slide bearing
EM Electric motor
VM Internal combustion engine

The invention claimed is:

1. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a groove nut threaded onto the transmission shaft for preloading the at least one bearing;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing.

2. The transmission of claim 1, further comprising an input shaft coupleable to an internal combustion engine, the input shaft connectable to the rotor shaft in a torque-proof manner by a shift element.

3. The transmission of claim 1, further comprising a retainer for retaining the electric motor, the transmission shaft and the rotor shaft supportable on the retainer by the at least one bearing.

4. The transmission of claim 3, wherein the transmission shaft is connected in a torque-proof manner to the rotor shaft by a positive-locking connection.

5. The transmission of claim 4, the at least one bearing is arranged radially between a section of the retainer and a section of the rotor shaft.

6. The transmission of claim 1, wherein the transmission shaft is supported on a transmission housing directly or through the output shaft by an additional bearing.

7. A hybrid drive comprising the transmission of claim 1, wherein an internal combustion engine is coupled with an input shaft, the input shaft connectable to the rotor shaft in a torque-proof manner by a shift element.

8. A motor vehicle comprising the hybrid drive of claim 7.

9. A motor vehicle comprising the transmission of claim 1.

10. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing, and
wherein the at least one bearing is supported in an axial direction on one side of the at least one bearing on the rotor shaft and on another side of the at least one bearing on a shoulder of the transmission shaft.

11. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing,
wherein the at least one bearing comprises at least one rolling bearing that is configured to absorb forces in an axial direction and a radial direction, and
wherein:
the at least one rolling bearing comprises a double-row angular ball bearing; or
the at least one rolling bearing comprises a first single-row angular ball bearing and a second single-row angular ball bearing with an adjuster arranged between the first single-row angular ball bearing and the second single-row angular ball bearing.

12. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing, and
wherein the at least one bearing comprises a first radial slide bearing and a second radial slide bearing.

13. The transmission of claim 12, wherein the at least one bearing comprises at least one axial bearing.

14. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing,
wherein the at least one bearing comprises a first radial slide bearing and a second radial slide bearing, and
wherein the transmission shaft is connected in a torque-proof manner to the rotor shaft by a positive-locking connection, the positive-locking connection of the rotor shaft and the transmission shaft arranged at least partially between the first and second radial slide bearings.

15. A transmission for a motor vehicle, comprising:
an electric motor having a rotor;
a rotor shaft connected in a torque-proof manner to the rotor of the electric motor;
at least one bearing that directly supports the rotor shaft;
a transmission shaft connected in a torque-proof manner to the rotor shaft;
a multi-speed transmission gearing in operative connection with the transmission shaft; and
an output shaft in operative connection with the transmission shaft by the transmission gearing;
wherein both the transmission shaft and the rotor shaft are supported directly on a transmission component by the at least one bearing, and
wherein the transmission shaft is centered on the rotor shaft by a fitting, the transmission shaft is connected to the rotor shaft with a spline connection, and the fitting is separate from the spline connection between the transmission shaft and the rotor shaft.

* * * * *